Jan. 12, 1926. Re. 16,248

W. C. JONES

STEEL LUMBER

Original Filed Sept. 22, 1923 2 Sheets-Sheet 1

Witness:
U. K. Olsen

Inventor:
WALTER CLYDE JONES
By Jones, Addington, Ames & Aiken
Attys.

Jan. 12, 1926. Re. 16,248

W. C. JONES

STEEL LUMBER

Original Filed Sept. 22, 1923 2 Sheets-Sheet 2

Witness:
W. K. Olson

Inventor:
WALTER CLYDE JONES.
By Jones, Addington, Ames & Aisbett
Attys.

Reissued Jan. 12, 1926. Re. 16,248

UNITED STATES PATENT OFFICE.

WALTER CLYDE JONES, OF EVANSTON, ILLINOIS.

STEEL LUMBER.

Original No. 1,548,809, dated August 4, 1925, Serial No. 664,155, filed September 22, 1923. Application for reissue filed October 15, 1925. Serial No. 62,679.

*To all whom it may concern:*

Be it known that I, WALTER CLYDE JONES, a citizen of the United States, residing at Evanston, in the county of Cook and State of Illinois, have invented certain new and useful Improvements in Steel Lumber, of which the following is a specification.

My invention relates to the manufacture of structural steel members, generally known as steel lumber, that are utilized in building construction.

More particularly my invention has special reference to steel lumber that may serve in a building construction as a substitute for wooden joists, wooden rafters, wooden studs, wooden lathing, wooden flooring and the like and, at the same time, perform the functions required of such corresponding wooden members in a much more satisfactory manner. As a result of my present invention, a building construction embodying my steel lumber may be made substantially fire proof or, at least, the fire hazard thereof may be reduced to a minimum. My steel lumber may be conveniently and economically manufactured from a single rolled section or unitary member that is then subsequently formed into the necessary shape whereby it may then serve most satisfactorily as a substitute for the usual wooden members that have heretofore entered into a building construction.

Again, by reason of my present invention, steel lumber is manufactured from metal sections that may preferably be readily rolled and pressed in conformability with commercial requirements by the usual rolling mills and presses since my steel lumber is fabricated in the form of relatively light members.

My invention, broadly considered, consists of a self-contained unitary Z-shaped lumber section which can be fabricated completely at the factory or before installation with all of the constituent parts thereof permanently and preferably integrally formed, so that it can be shipped, handled and installed as a unit, the same comprising essentially a combination Z-shaped steel lumber section possessing a relatively heavy or thick studding portion to serve as the weight supporting element in a building structure, such as a joist or studding, relatively thin plate sustaining portions permanently formed upon the studding portion and extending laterally therefrom in opposite directions and each being of sufficient width, in conjunction with the adjoining lumber sections, to span the spaces between adjacent studding portions, said sustaining plate portions serving as lathing, either external or internal, on the ceiling or side walls, or flooring and the like of a building structure.

To compare specifically wooden members that have heretofore entered into a building construction with the steel lumber of my present invention, I might state that wooden building members, such as joists, rafters, studs, lathing, flooring and the like, are made in separate and distinct pieces, each requiring a separate manufacturing operation as well as separate handling and assembling, in order to incorporate them properly into a building structure. My steel lumber is preferably manufactured from a unitary rolled section that, when properly formed, may serve as an integral combination joist, lathing and flooring structure, or as an integral combination stud, interior lathing and exterior lathing structure, or as other similar combinations. My steel lumber sections, after being formed in accordance with requirements, are then assembled into a built-up structure by securing the lumber sections to one another in any suitable permanent manner thus procuring a fabricated metal building construction.

Heretofore steel lumber has been manufactured as separate and distinct sections such as joists, studs, rafters, flooring, lathing and the like. In some instances, it has been customary to build up separate floor members, as joists and studs, from a plurality of sheet metal parts of standard form, for instance, channel irons, angle irons, steel plates and the like. In building constructions employing such prior built-up steel lumber sections, the metal lathing or metal flooring had to be separately handled and applied as an independent member to the supporting studding members, such as joists and studs. Such prior structures in which the flooring or lathing portions are made separate from the joists, studs or rafters and must be assembled on the job are more expensive to manufacture and install than the lumber sections of my present invention in which the studding portions and the sustaining plate portions for the flooring and lathing can be fabricated at the factory as self contained unitary combination sections which can be installed on the job by merely fitting and fastening the several combination sections together, no metal working being necessary on the job and, in consequence, a cheaper type of labor being permissible for installation.

An object, therefore, of my invention is to provide steel lumber section from which a building construction may be fabricated and each of which preferably constitutes a unitary rolled member that may be subsequently fashioned as a combination integrally formed studding and interior lathing and exterior lathing member, or as a combination integrally formed joist and lathing and flooring member, or as other suitable combination integrally formed members that comprise building construction.

Another object of my invention is to provide a method of manufacturing such steel lumber sections as I have indicated above which comprises rolling a properly shaped steel section that is subsequently formed by means of a suitable press operation to provide a steel lumber member as described above.

A further object of my invention is to provide steel lumber sections that are capable of being nested into one another so that minimum space will be required for storing and shipping them and whereby a number of such steel sections may be handled together without undue inconvenience.

Another object of my invention is to provide steel lumber sections that are capable of being expeditiously assembled and secured to one another permanently, if desired, without requiring any extensive fitting or matching of the sections entering into the building construction fabricated from my steel lumber sections.

Another object of my invention is to provide a new form of building construction which is fabricated from Z-shaped steel lumber unitary sections that are secured to one another and assembled to form a permanent skeleton structure.

Other objects of my present invention will be hereinafter described and for a better understanding of the nature, scope and characteristic features of my invention, reference may be had to the following description and the accompanying drawings, in which—

Figure 1:
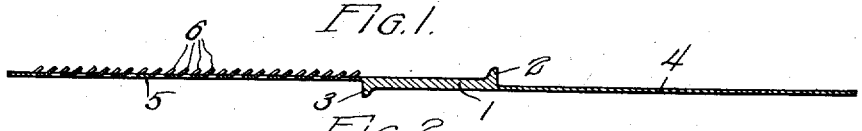
Figure 1 is a cross-sectional view showing a rolled steel section embodying a form of my invention.
Figure 2:
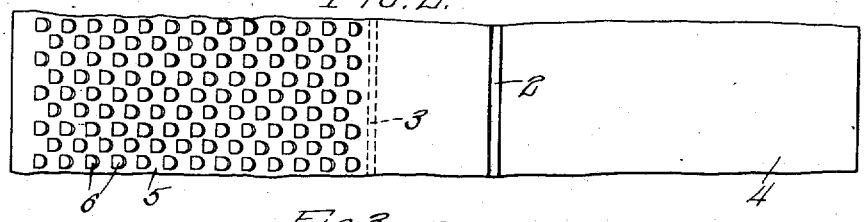
Fig. 2 is a top plan view of the rolled steel section of Fig. 1 showing one of the plane relatively thin lateral portions perforated, if desired, to form a metal lathing.

Referring to Figs. 1 and 2, the first step in my present invention consists in forming a unitary rolled section of a shape that may be produced in rolling mills of the usual standard construction. The unitary rolled section of Fig. 1 emerges from a rolling mill with a relatively thick central portion 1 having an integral flange 2 formed on its upper face along one of its edges and a diagonally opposite integral flange 3 formed on its under face along its other edge. Adjacent to the upstanding flange 2 a relatively thin plane or sustaining plate portion 4 is formed which may be coextensive with the under face of the central portion 1 and, similarly, a second relatively thin plane or sustaining plate portion 5 is formed adjacent to the upstanding flange 3 and coextensive with the upper face of the central portion 1. The unitary sections of Figures 1 and 2 may be rolled into any suitable lengths—namely, 12 feet, 14 feet, 16 feet and the like, corresponding to the standard lengths in which wooden lumber sections that enter into building construction have been furnished in the past.

In conformity with standard dimensions and specifications of wooden members employed in the usual building construction, the unitary rolled steel lumber sections of Figs. 1 and 2, in addition to being rolled into proper lengths, as mentioned above, may be so proportioned that the relatively thick central portion 1 is from 4 inches to 6 inches wide and about 1/8 inch thick, and the sustaining plate portions 4 and 5 may be 16 inches wide and approximately 1/32 inch thick In building construction, it is customary to space the sections constituting the studding—namely the joists, studs or weight supporting members, on 16 inch centers and for this reason I have suggested 16 inches as a suitable and convenient transverse dimension for the relatively thin and oppositely extending sustaining plate portions 4 and 5. The usual depth of wooden studs or joists embodied in standard building construction may range from 4 inches to 6 inches and to this end I have suggested a corresponding transverse dimension for the central relatively thick studding portion 1 of my steel lumber section. Of course, I am not to be limited to any arbitrary dimensions or proportions of the several parts of the unitary rolled section from which I fashion my steel lumber.

Figure 3:
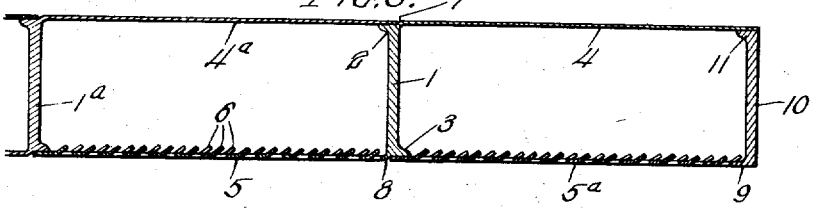
Fig. 3 is a transverse cross-sectional view showing a building construction of my invention comprising Z-shaped unitary steel lumber formed from the rolled steel section of Figs. 1 and 2.

Referring to Fig. 3, I have shown the manner in which the rolled unitary sections of Figs. 1 and 2 may be subsequently formed and assembled in order to be incorporated into a building construction. It will be observed that the relatively thick central portion 1 constitutes either the stud or joist, as desired, and as such is provided with a suitable thickness to sustain the necessary stresses and strains to which it may be subjected. The relatively thin sustaining plate portion 4 is bent at right angles to the central portion 1 so as to project oppositely to the flange 2 from the central portion 1. Similarly, the relatively thin sustaining plate portion 5 is bent at right angles to the central portion 1 but in a direction opposite to the relatively thin sustaining plate portion 4. As a consequence, the relatively thin sustaining plate portion 5 projects from the thick central portion 1 in a direction opposite to the flange 3. If desired, the relatively thin portion 5 may be provided with a series of perforations 6, as shown in Figs. 1, 2 and 3, thereby forming a metal lathing. Of course, it is to be understood that either or both of the portions 4 and 5 may be perforated as shown or serrated or otherwise distorted into any of the usual forms employed for lathing, flooring and the like. In the event that the central portion 1 serves as a stud the bent-over portion 4 may then serve as interior lathing, provided it is suitably distorted, and the bent-over portion 5 may serve as exterior lathing to which stucco may be applied. If the central portion 1 serves as a joist in a building construction, the bent-over portion 4 may then form a flooring member for the upper floor and the bent-over portion 5 a metal lathing for the ceiling below.

The steel lumber section of Figs. 1 and 2, when suitably pressed or formed, constitutes a unitary Z-shaped member as shown in Fig. 3, and as such may be incorporated as a unit in a building construction with other similar Z-shaped members. In assembling these Z-shaped lumber sections to form a fabricated building construction, adjacent Z-shaped lumber sections are supported upon one another to form a skeleton structure.

It will be observed that when the thin sustaining plate portion 4 is bent-over at right angles to the relatively thick studding portion 1 a recess 7 is formed coextensive with the flange 2 and, similarly, a recess 8 is formed coextensive with the flange 3 when the relatively thin sustaining plate portion 5 is bent at right angles to the studding portion 1 and opposite to the portion 4. In assembled position the outer edge of the thin sustaining plate portion $4^a$ of the adjacent Z-shaped member rests upon the flange 2 and by reason of the recess 7 is coextensive with the relatively thin portion 4 of the adjacent Z-shaped member. In a like manner the adjacent relatively thin sustaining plate portion $5^a$ of an oppositely adjacent member engages the lower face of the flange 3 and by reason of the recess 8 is coextensive with the relatively thin portion 5 so as to form a flat plane surface for the ceiling. In assembling my steel lumber sections as shown in Fig. 3, the outer edge of the portion $4^a$ may, if desired, be welded to the flange 2 or secured thereto in any other suitable manner and, likewise, the outer edge of the portion $5^a$ may be secured or permanently attached to the flange 3.

Figure 4:
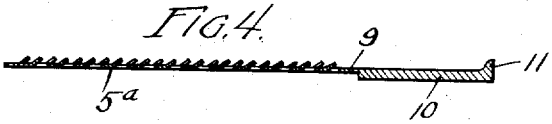
Fig. 4 is a cross-sectional view showing a rolled steel section that may be embodied in my building construction as one of the end members, as shown, in Fig. 3.
Figure 5:
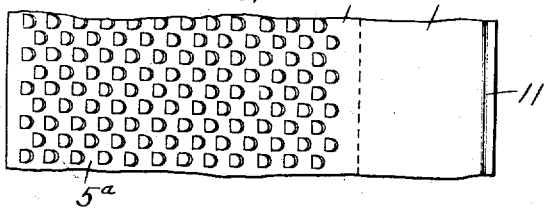
Fig. 5 is a plan view of the rolled steel section of Fig. 4 in which the relatively thin lateral portion, if desired, is perforated to form metal lathing.

To complete the built-up structure of Fig. 3 comprising my unitary Z-shaped steel lumber sections, the ends of the structure are provided with a member 9 that is illustrated in Fig. 4. The unitary lumber section 9 may be rolled in any suitable rolling mill and comprises a relatively thick studding portion 10 and the relatively thin sustaining plate portion $5^a$. The outer edge of the relatively thick portion 10 is provided with an upstanding flange 11 which is preferably formed with a plane exposed edge. When the member 9 is formed as shown in Fig. 3, so that the relatively thin sustaining plate portion $5^a$ is bent at right angles to the relatively thick portion 10 the flange 11 may then serve as a support for the outer edge of the relatively thin sustaining plate portion 4 of the adjacent unitary Z-shaped steel lumber section. The relatively thin sustaining plate portion 5ª of Fig. 4 may be perforated, as shown in Figs. 3, 4 and 5, in order that it may serve as metallic lathing in conjunction with the metal lathing formed by the relatively thin sustaining plate portion 5 of the adjacent Z-shaped lumber section.

Figure 6:
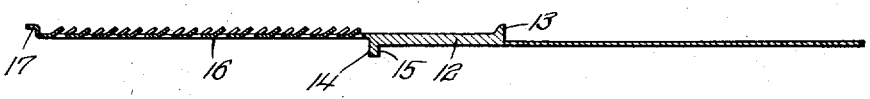
Fig. 6 is a cross-sectional view showing a modified form of the rolled steel section of Fig. 1.
Figure 7:
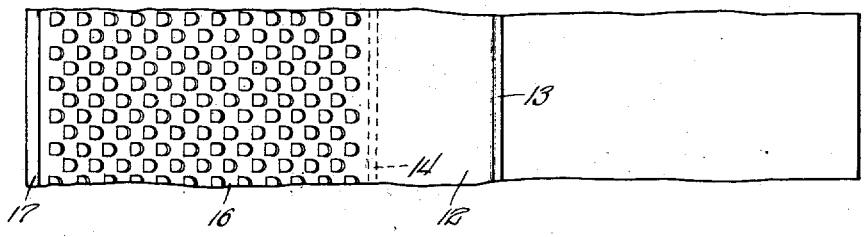
Fig. 7 is a top plan view of the member illustrated in Fig. 6 in which one of the relatively thin lateral portions is perforated, if desired, to form a metal lathing.
Figure 8:
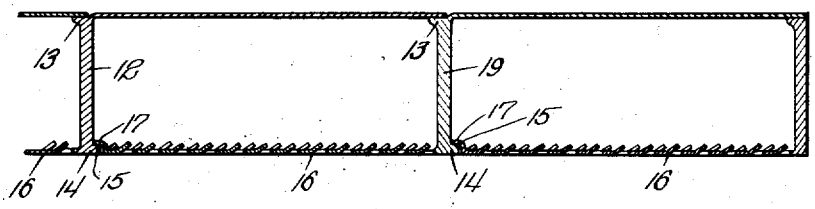
Fig. 8 is a cross-sectional transverse view of a building construction comprising the steel lumber sections of Figs. 6 and 7.

In Fig. 6 I have shown a modified form of a lumber section in which a relatively thick central studding portion 12 is provided with a longitudinally upstanding flange 13 on its upper face, which flange is quite similar to the flange 2 formed on the studding portion 1 of the lumber section of Fig. 1. A second longitudinal flange 14 is formed on the under face of the studding portion 12 and provided with a substantially flat surface 15, the purpose of which will be understood in connection with the building construction of Fig. 8. A relatively thin sustaining plate portion 16, which in this instance serves as a metal lathing, is provided at its outer edge with the offset portion 17 which may be formed at the same time that the unitary lumber section of Fig. 6 is rolled or it may be subsequently formed, as desired. After the rolled unitary section of Fig. 6 is properly shaped, it will assume the Z-shape as shown in Fig. 8. In assembling the building construction of Fig. 8 the offset portion 17 will be received on the upper surface 15 of the flange 14 and may be welded to the flange 14 if it is desired to do so. The relation between the offset portion 17 and the flange 14 is such that in the assembled building construction the surface formed from the relatively thin contiguous sustaining plate portions 16 of my lumber sections will be substantially level throughout.

Figure 9:
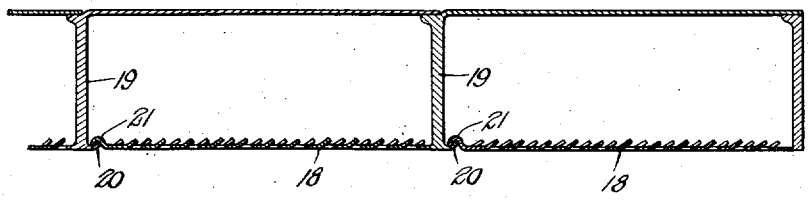
Fig. 9 is a cross-sectional transverse view showing a building construction fabricated from steel lumber embodying a form of my invention.

In Fig. 9 I have shown a modified form for securing a relatively thin lathing or sustaining plate portion 18 of my steel lumber section to the studding portion 19 of an adjacent steel lumber section. In this event, a flange 20 is bent up on the section 19 and is adapted to engage with a hook portion 21 formed on the outer edge of the lathing portion 18 of the adjacent Z-shaped steel lumber section. In this circumstance, the engagement between the flange 20 and the portion 21 serves as a substitute for the offset portion 17 and the flange 14 of the building construction shown in Fig. 8. When the structure of Fig. 9 is adopted welding of the adjacent Z-shaped lumber sections to each other may be dispensed with and the steel lumber sections will permanently retain their relative positions in the fabricated building construction.

Figure 10:
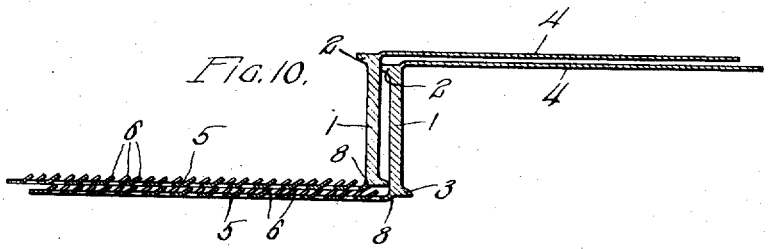
Fig. 10 is a diagram showing the method in which Z-shaped steel lumber sections built in accordance with my invention may be nested into one another so as to occupy minimum shipping and storage space.
Figure 11:
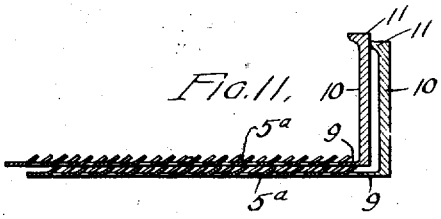
Fig. 11 is a view showing the method in which the end members incorporated in the building constructions of Fig. 3 may be nested into one another to occupy minimum shipping and storage space.

By referring to Fig. 10, it will be seen how my unitary Z-shaped steel lumber sections of Fig. 3 may be nested into one another in order to occupy minimum space in storage as well as in shipping. In Fig. 11, the unitary L-shaped steel lumber sections of Figs. 4 and 5 are nested into each other in order to occupy minimum space.

The terms "studding," "studding portion," "studs" and the like, as used herein, comprise in their meaning such members as joists, studs, rafters, etc., that are adapted to serve as the weight supporting elements or members of a building structure. Likewise, the terms "sustaining plate portion," "lathing portion," "flooring," and the like are used synonymously and comprise in their meaning lathing, either external or internal, on the ceiling or side walls, flooring and the like, which elements of a building structure are relatively thin in comparison with the studs or joists and are of sufficient width to span the space between adjacent members constituting the studding portions of a building structure. As herein described, the spacings and dimensions of the studding portions and of the sustaining plate portions may be in conformity with the present standard spacings and dimensions employed in building structures but, of course, I am not limited to any arbitrary selection of size or dimension or spacing for my present steel lumber.

From the foregoing description of my invention it will be apparent that I have provided a very economical steel lumber unit which may be readily formed preferably from a unitary rolled section and which permits of convenient assembly and incorporation into a building construction. At the same time, my steel lumber sections are of such shape that they may be readily nested into one another so as to occupy minimum shipping and storage space. Again, by employing my unitary Z-shaped steel lumber a substantially fire-proof building construction may be expeditiously fabricated in minimum time because three separate building members are comprised in a single unitary section that may be conveniently handled.

While I have herein shown and described several embodiments of my invention, it is to be understood that I do not desire to be limited to any specific structures shown and described since many modifications may be made in my invention without departing from the scope and spirit of the appended claims.

What I claim as new and desire to secure by Letters Patent of the United States is:—

1. A one piece steel lumber section formed from a rolled unitary member comprising a relatively thick studding portion that serves as a building supporting element, said studding portion having integrally formed exposed flanges disposed on opposite sides thereof along its two longitudinal edges, and relatively thin sustaining plate portions extending laterally from said studding portion and integrally formed therewith, said sustaining plate portions being coextensive with and adjacent to said flanges.

2. A one piece steel lumber section formed from a rolled unitary member comprising a relatively thick studding portion which serves as a building supporting element, said studding portion having integrally formed exposed flanges disposed on opposite sides thereof along its two longitudinal edges, and relatively thin sustaining plate portions extending laterally from said studding portion that are coextensive with and adjacent to said flanges, each of said relatively thin portions projecting oppositely from its associated flange.

3. A one piece steel lumber section formed from a rolled unitary member comprising a relatively thick studding portion having integrally formed longitudinal and oppositely exposed flanges along its two edges, and relatively thin sustaining plate portions extending laterally from said studding portion that are coextensive with and adjacent to said flanges, each of said relatively thin portions projecting oppositely from its associated flange and one of said relatively thin portions being deformed to constitute a metal lathing.

4. A one piece steel lumber section formed from a rolled unitary member comprising a relatively thick studding portion that serves as a building supporting element, said studding portion having exposed and longitudinal flanges disposed on opposite sides of the studding portion along its two edges, and relatively thin sustaining plate portions extending oppositely from each other and laterally from said studding portion with which said sustaining plate portions are integrally formed, each of said relatively thin sustaining plate portions being adjacent to one of said longitudinal flanges and said studding portion being longitudinally recessed on its opposed edges adjacent to each of said flanges.

5. A one piece steel lumber section comprising a central relatively thick studding portion having oppositely disposed flanges projecting therefrom along the longitudinal periphery of said studding portion, and integrally formed relatively thin sustaining plate portions adjacent to said flanges and extending laterally of and oppositely from said studding portion.

6. A Z-shaped one piece steel lumber section formed from a rolled unitary member comprising a relatively thick central studding portion, and relatively thin sustaining plate portions extending oppositely to each other and laterally from said studding portion and adjacent to opposed edges thereof.

7. A Z-shaped one piece steel lumber section formed from a rolled unitary member comprising a relatively thick central studding portion, and relatively thin sustaining plate portions extending oppositely to each other and laterally from said studding portion adjacent to opposed edges thereof, at least one of said relatively thin sustaining plate portions being deformed to constitute a metal lathing.

8. A Z-shaped one piece steel lumber section formed from a rolled unitary member comprising a relatively thick central studding portion having integral longitudinal flanges upstanding from the opposite faces thereof, and relatively thin sustaining plate portions extending oppositely to each other and laterally from said studding portion adjacent to opposed edges thereof, one of said relatively thin portions being deformed to constitute a metal lathing.

9. A one piece steel lumber section formed from a rolled member comprising a relatively thick central studding portion having upstanding integral flanges formed on opposite sides thereof and adjacent to its edges, and relatively thin sustaining plate portions extending laterally from said studding portion and adjacent to said flanges, said relatively thin portions projecting in opposite directions from said studding portion.

10. A one piece steel lumber section formed from a rolled unitary member comprising a relatively thick studding portion having flanges projecting oppositely therefrom and formed adjacent to its edges, and relatively thin plate sustaining portions extending laterally from said studding portion and adjacent to said flanges, said relatively thin portions projecting oppositely from said studding portion and the associated adjacent flanges in parallel planes that are spaced from each other.

11. A one piece steel lumber section comprising a central relatively thick studding portion having flanges projecting therefrom in opposite directions, a relatively thin sustaining plate lathing portion extending laterally from said studding portion adjacent to one of said flanges but projecting oppositely therefrom, a second relatively thin sustaining plate portion parallel to but spaced from said lathing portion extending laterally from said studding portion adjacent to another of said flanges but projecting oppositely therefrom, said relatively thin sustaining plate portions and studding portion being integrally formed from a rolled unitary member.

12. A one piece steel lumber section comprising a central relatively thick studding portion having flanges projecting therefrom in opposite directions, a relatively thin sustaining plate portion extending laterally from said studding portion adjacent to one of said flanges but projecting oppositely therefrom, a second relatively thin sustaining plate portion parallel to but spaced from said first thin portion extending laterally from said studding portion adjacent to another of said flanges but projecting oppositely therefrom, said relatively thin sustaining plate portions and studding portion being integrally formed from a unitary member, and one of said relatively thin portions being deformed to constitute a metal lathing.

13. A one piece steel lumber section comprising a central relatively thick studding portion having diagonally opposite and exposed flanges projecting therefrom along its longitudinal periphery, and integrally formed relatively thin sustaining plate portions adjacent to said flanges that are bendable to be extended laterally of said studding portion and oppositely to each other.

14. A building construction comprising a plurality of side-by-side unitary Z-shaped lumber sections each of which constitutes a one piece member having a central relatively thick studding portion that serves as a building supporting element, a relatively thin lathing portion and another oppositely extending relatively thin sustaining plate portion, the several lumber sections when in assembled position having said lathing portions and said other oppositely extending sustaining plate portions similarly assembled to form severally contiguous and coinciding plane surfaces, said lathing portion of each lumber section being attached to the studding portion of a Z-shaped section on one side of said lumber section and said other opposed sustaining plate portion of each lumber section engaging the studding portion of a Z-shaped section on the opposite side of said lumber section.

15. A building construction comprising side-by-side unitary Z-shaped lumber sections each of which comprises a relatively thick studding portion that serves as a building supporting element, a relatively thin lathing portion and a second relatively thin sustaining plate portion extending oppositely to said lathing portion, the several Z-shaped sections when in assembled positions having their said lathing portions contiguous with one another and engaging the studding portions of adjacent Z-shaped sections on one side and having their said second thin sustaining plate portions likewise contiguous with one another and engaging the studding portions of adjacent Z-shaped sections on the side opposite to said studding portions engaged by said associated lathing portions, and means for securing the Z-shaped sections to one another.

16. A Z-shaped one piece steel lumber section formed from a rolled unitary member comprising a relatively thick central studding portion that serves as a building supporting element, and relatively thin sustaining plate portions formed integrally with said studding portion and extending laterally therefrom in opposite directions, said studding portion being longitudinally recessed adjacent to at least one of its edges.

17. A Z-shaped one-piece steel lumber section formed from a rolled unitary member comprising a relatively thick central studding portion that serves as a building supporting element, and relatively thin sustaining plate portions formed integrally with said studding portion and extending laterally therefrom in opposite directions, said studding portion having at least one exposed flange and being longitudinally recessed adjacent to at least one of its edges.

18. A Z-shaped one piece steel lumber section formed from a unitary member comprising a relatively thick central studding portion that serves as a building supporting element, relatively thin sustaining plate portions formed integrally with said studding portion and extending laterally therefrom in opposite directions, and means for supporting the sustaining plate portions of adjacent lumber sections upon said steel lumber section.

19. A Z-shaped one piece steel lumber section formed from a unitary member comprising a relatively thick central studding portion that serves as a building supporting element, relatively thin sustaining plate portions formed integrally with said studding portion and extending laterally therefrom in opposite directions, and means for supporting upon said studding portion the sustaining plate portions of adjacent lumber sections.

20. A Z-shaped one piece steel lumber section formed from a rolled unitary member comprising a relatively thick central studding portion that serves as a building supporting element, and relatively thin sustaining plate portions extending laterally from said studding portion and in opposite directions from said studding portion, said studding portion and said sustaining plate portions being integrally formed.

21. A self contained permanently organized steel lumber section adapted to be fabricated completely before installation and constituting a Z-shaped unitary structure serving as a combination building element, which comprises a relatively thick weight supporting studding portion and relatively thin sustaining plate portions extending laterally from said studding portion in opposite directions, said sustaining plate portions being of sufficient width, in conjunction with adjoining lumber sections, to span the spaces between adjacent studding portions.

22. A self contained permanently organized steel lumber section adapted to be fabricated completely before installation and constituting a Z-shaped unitary structure serving as a combination building element, which comprises a relatively thick weight supporting studding portion, and relatively thin plate sustaining portions extending laterally and in opposite directions from said studding portion, each of said sustaining plate portions possessing a width suitable to span the space between studding portions of adjacent lumber sections.

23. A self contained permanently organized steel lumber section adapted to be fabricated completely before installation and constituting a Z-shaped unitary structure serving as a combination building element, which comprises a relatively thick weight supporting studding portion, and relatively thin sustaining plate portions extending laterally and in opposite directions from said studding portion, said sustaining plate portions being of sufficient widths, in conjunction with adjoining lumber sections, to span the spaces between adjacent studding portions, the lumber section being provided with suitable means for supporting the outer edges of the sustaining plate portions of adjacent lumber sections.

24. A building construction comprising side-by-side Z-shaped combination steel lumber sections, each lumber section adapted to be fabricated completely and permanently organized before installation and constituting a self contained unitary combination building element which comprises a relatively thick weight supporting studding portion, and relatively thin plate sustaining portions extending laterally and in opposite directions from said studding portions, said sustaining plate portions being of sufficient widths, in conjunction with the adjoining lumber sections, to span the spaces between the studding portions of adjacent lumber sections, the lumber sections when in assembled position having their plate sustaining portions contiguous and suitably supported at their outer ends by the adjoining lumber sections.

In testimony whereof, I have subscribed my name this 13th day of October, 1925.

WALTER CLYDE JONES.